United States Patent
Suzuki et al.

(10) Patent No.: US 6,611,352 B2
(45) Date of Patent: *Aug. 26, 2003

(54) IMAGE FORMING APPARATUS AND IMAGE FORMING METHOD

(75) Inventors: Masakazu Suzuki, Yamatokoriyama (JP); Kouichi Etoh, Nara (JP); Atushi Saito, Yamatokoriyama (JP); Naoyuki Kamei, Nara (JP); Naoto Harada, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,037

(22) Filed: May 20, 1999

(65) Prior Publication Data

US 2003/0107765 A1 Jun. 12, 2003

(30) Foreign Application Priority Data

May 22, 1998 (JP) ............................................. 10-141702

(51) Int. Cl.$^7$ .......................... G06K 15/00; G03G 15/00
(52) U.S. Cl. ..................... 358/1.18; 358/1.16; 399/364; 399/373; 399/374
(58) Field of Search ......................... 358/1.3, 1.9, 1.16, 358/1.18; 399/16, 17, 364, 373, 374

(56) References Cited

U.S. PATENT DOCUMENTS

| | | | | |
|---|---|---|---|---|
| 4,099,254 A | * | 7/1978 | Andrews et al. ............ 364/900 |
| 4,910,612 A | | 3/1990 | Yamazaki .................... 358/496 |
| 4,990,941 A | * | 2/1991 | Kawai ...................... 346/153.1 |
| 5,347,351 A | | 9/1994 | Morita et al. ............... 355/313 |
| 5,491,557 A | | 2/1996 | Nakajima et al. ........... 358/296 |
| 5,598,271 A | * | 1/1997 | Ohtani ........................ 358/296 |
| 6,281,983 B1 | * | 8/2001 | Takahashi .................... 358/1.2 |
| 6,285,852 B1 | * | 9/2001 | Etoh ............................ 399/367 |
| 6,333,796 B1 | * | 12/2001 | Isozaki ........................ 358/498 |
| 6,400,461 B1 | * | 6/2002 | Oikawa ....................... 358/1.1 |
| 2001/0012124 A1 | * | 8/2001 | Morikawa .................... 358/296 |
| 2001/0013942 A1 | * | 8/2001 | Sakamoto et al. .......... 358/1.13 |

FOREIGN PATENT DOCUMENTS

| | | | | |
|---|---|---|---|---|
| JP | 63086954 | | 4/1988 | ............ H04N/1/04 |
| JP | 363108858 | * | 5/1988 | .......... H04N/1/387 |
| JP | A-63-224468 | | 9/1988 | ............ H04N/1/04 |
| JP | A-5-183706 | | 7/1993 | ............ H04N/1/21 |
| JP | 08191370 | * | 1/1996 | .......... G03G/15/00 |
| JP | 8274970 | | 10/1996 | .......... H04N/1/387 |
| JP | 409006074 | * | 1/1997 | .......... G03G/15/00 |
| JP | 9298620 | | 11/1997 | ............ H04N/1/00 |
| JP | 410283372 | * | 10/1998 | .......... G06F/17/30 |

* cited by examiner

*Primary Examiner*—Jerome Grant, II
(74) *Attorney, Agent, or Firm*—Birch, Stewart, Kolasch & Birch, LLP

(57) ABSTRACT

Images are formed in the S-D and D-D modes and sheets of recording paper after image formation are arranged in accordance with the order of pages. A document of an odd-numbered page placed on a paper feeding tray in a document transport part is fed to an image reading part and an image is read and stored into a RAM. Subsequently, a document of an even-numbered page is fed and an image is read. A sheet of recording paper housed in a paper feeding cassette is transported to an image forming part and the image is formed on one of the surfaces of the sheet of recording paper. Further, the sheet of recording paper is transported to a path, turned upside down, and transported again to the image forming part. The image stored in the RAM is read out and formed on the other surface of the sheet of recording paper. Finally, the sheet of recording paper is transported with the other surface facing downward and ejected to an output tray. By repeating the operation, the sheets of recording paper can be ejected in accordance with the order of pages.

12 Claims, 13 Drawing Sheets

IMAGE FORMING APPARATUS AND IMAGE FORMING METHOD

BACKGROUND OF THE INVENTION

1. Field of the Invention

The present invention relates to an image forming apparatus and image forming method which can form images on both sides of a sheet of recording paper.

2. Description of the Related Art

Copying machines as image forming apparatuses which can print images on both sides of a sheet of recording paper P include a copying machine as shown in FIG. 1 which operates in a mode of reading an image from a document D having an image drawn on one side and printing the image on both sides of the sheet of recording paper P (hereinbelow, referred to as "S-D mode") and a copying machine as shown in FIG. 9 which operates in a mode of reading images from a document D having images drawn on both sides and printing the images on both sides of the sheet of recording paper P (hereinbelow, referred to as "D-D mode"). Each of such copying machines comprises, broadly, an image reading part for reading an image of the document D, a document transport part for transporting the document D to the image reading part, an image forming part for printing the read image onto the sheet of recording paper P, and a recording paper transport part for transporting the sheet of recording paper P to the image forming part.

FIG. 15 is a block diagram of a copying machine of a related art which operates in the S-D mode. The copying machine comprises a control unit 101, an operation panel 102, a reading side drive source 103, a body side drive source 104, a printing control unit 105, and a sheet reversal control unit 106. The components are connected via a bus line 107. The control unit 101 realized by a CPU (central processing unit) or the like controls the operation of the whole copying machine. The reading side drive source 103 is driven in response to designation of start of copying from the operation panel 102, the document D is transported to the image reading part, and an image is read. The body side drive source 104 is also driven, thereby transporting the sheet of recording paper P to the image forming part. The printing control unit 105 prints the read image onto the sheet of recording paper P by controlling the image forming part. The sheet reversal control unit 106 turns the sheet of recording paper P upside down so that the images are printed on both sides of the sheet of recording paper P by controlling the recording paper transport part.

FIG. 16 is a flowchart showing an image forming operation of the copying machine of FIG. 15. When an image of the document D is read in step S1, the image is printed on one of the surfaces of the sheet of recording paper P in step S2. The routine progresses to step S3 where an image on the next document D is read. Further, the routine advances to step S4 where the sheet of recording paper P having the image printed on one of the surfaces is turned upside down. In step S5, the image read in step S3 is printed on the other surface of the sheet of recording paper P. In step S6, whether there is the next document D or not is determined. When there is the next document D, the routine is returned to step S1. When there is no document D, the operation is finished.

FIG. 17 is a block diagram of a copying machine of another related art which operates in the D-D mode. The block diagram of the copying machine is obtained by eliminating the printing control unit 105 in FIG. 15 and adding an odd-numbered page printing control unit 108, an even-numbered page printing control unit 109, and a document reversal control unit 110 to FIG. 15. The same blocks are designated by the same reference numerals and their description is omitted here. The odd-numbered page printing control unit 108 controls an operation of printing the read image onto one of the surfaces of the sheet of recording paper P. The even-numbered page printing control unit 109 controls the operation of printing the read image onto the other surface of the sheet of recording paper P. The document reversal control unit 110 turns the document D upside down in order to read images on both sides of the document D.

FIG. 18 is a flowchart showing an image forming operation of the copying machine of FIG. 17. In step S11, an image on the surface of the document D is read. In step S12, the image is printed on one of the surfaces of the sheet of recording paper P. The routine advances to step S13 where the document D is turned upside down. Further, in step S14, the sheet of recording paper P is turned upside down. In step S15, an image on the back of the document D is read. In step S16, the image is printed on the other surface of the sheet of recording paper P. In step S17, whether there is the next document D or not is determined. If there is the next document D, the routine is returned to step S11. When there is no next document D, the operation is finished.

Japanese Unexamined Patent Application JP-A 63-224468 (1988) discloses a copying machine having a memory for storing read image information. Further Japanese Unexamined Patent Application JP-A 5-183706 discloses a copying machine such constituted that images of all documents are read only on time and stored in a memory to thereafter form a necessary volume of copies by reading the image data from the memory.

When continuous copying operations are performed by the copying machines of the related arts which operate in the S-D and D-D modes, such an inconvenience occurs that the printed faces of the sheets of recording paper P which are printed and ejected are not arranged in order of page. Referring to FIG. 8A, a specific description regarding first to third ejected sheets of recording paper P1 to P3 will be given as an example. The second sheet of recording paper P2 is stacked on the first sheet of recording paper P1 and the third sheet of recording paper P3 is stacked on the second sheet of recording paper P2. In each of the sheets of recording paper P1 to P3, the odd-numbered page is arranged to be on the surface (the top face in FIG. 8A) side of the sheet of recording paper and the even-numbered page is arranged to be on the back (the under face in FIG. 8A) side of the sheet of recording paper. The order of pages becomes, therefore, 2, 1, 4, 3, 6, and 5.

In the copying machines of Japanese Unexamined Patent Publications JP-A 63-224468 (1988) and JP-A 5-183706 (1993), since the storage capacity of the memory is limited, an inconvenience such that a large amount of image information to be read cannot be stored occurs. Since the storage capacity is fixed, the memory cannot be efficiently used. Additionally the copying machine disclosed in JP-A 5-183706 (1993) it is necessary to select a sequence of reading image data from the memory, in order to arrange the printed faces of the ejected sheets of recording paper in order of page. A mechanism for reversing faces of the ejected sheet of recording paper is required.

SUMMARY OF THE INVENTION

It is an object of the invention to provide an image forming apparatus and image forming method which can eject sheets of recording paper after image formation in the S-D and D-D modes in accordance with the order of pages.

The invention relates to an image forming apparatus comprising:

reading means for reading an image on a document;

document transporting means for sequentially transporting documents to the reading means;

image forming means for forming an image on a sheet of recording paper;

recording paper transporting means for transporting the sheet of recording paper; and storing means for storing image information read by the reading means, the apparatus comprising control means for allowing an image drawn on one side of each document to be sequentially read by the reading means and formed on both sides of each sheet of recording paper by the image forming means, the control means allowing an image of an odd-numbered document to be read by the reading means and stored into the storing means, allowing an image of an even-numbered document to be read by the reading means and formed on one of the surfaces of a sheet of recording paper by the image forming means, allowing the sheet of recording paper to be turned upside down by the recording paper transporting means, allowing the image stored in the storing means to be read out and formed on the other surface of the sheet of recording paper by the image forming means, and allowing the sheet of recording paper to be transported with the other surface facing downward by the recording paper transporting means.

According to the invention, an image of an odd-numbered document is read and stored. Subsequently, an image of an even-numbered document is read and formed on one of the surfaces of a sheet of recording paper. Further, the sheet of recording paper is turned upside down, and the stored image is read out and formed on the other surface of the sheet of recording paper. Finally, the sheet of recording paper is transported with the other surface facing downward. Consequently, at the time of execution in the S-D mode, the order of pages of the sheets of recording paper after image formation becomes 1, 2, 3, 4, . . . . Thus, the sheets of recording paper can be ejected in accordance with the order of pages.

According to the invention as mentioned above, an image of an odd-numbered document is read and stored. Subsequently, an image of an even-numbered document is read and formed on one of the surfaces of a sheet of recording paper. Further, the sheet of recording paper is turned upside down, and the stored image is read out and formed on the other surface of the sheet of recording paper. Finally, the sheet of recording paper is transported with the other surface facing downward. Consequently, at the time of execution in the S-D mode, the sheets of recording paper can be ejected in accordance with the order of pages.

In the invention it is preferable that the apparatus further comprises:

detecting means for detecting the size of the document;

determining means for comparing the size of the detected document with a size of a predetermined reference document and determining whether the detected document is larger or not; and thinning means for thinning out image information read from the document when the detected document is larger on the basis of the determination result and storing the resultant image into the storing means.

According to the invention, at the time of execution in the S-D mode, when it is determined that the document is larger than the predetermined reference document, that is, when it is determined that all of the read image information cannot be stored into the storing means, the read image information is thinned out and stored. The sheets of recording paper can be, therefore, certainly arranged in order of page irrespective of the size of a document, namely, an amount of image information to be read.

According to the invention, at the time of execution in the S-D mode, when the document is larger than the predetermined reference document, the read image information is thinned out and stored. Thus, the sheets of recording paper can be certainly arranged in order of page irrespective of the size of the document.

In the invention it is preferable that the storage capacity of the storing means is determined on the basis of an amount of image information read from the first document.

According to the invention, at the time of execution in the S-D mode, the storage capacity of the storing means for storing the image information is determined on the basis of the amount of the image information of the first document. Consequently, the subsequent image information can be certainly stored and the storing means can be efficiently used.

The storage capacity determined based on the image information amount of the first document is set to the predetermined reference document. For example, when an image information amount of the second document is detected and the image information amount is larger than that of the first document, the image information of the second document can be thinned out. Consequently, the operation of setting a specific value as the size of the reference document is made unnecessary and the construction can be simplified. Since the setting operation of the operator becomes unnecessary, the convenience can be improved.

According to the invention, at the time of execution in the S-D mode, since the storage capacity of the storing means is determined on the basis of the image information amount of the first document, the subsequent image information can be certainly stored and the storing means can be efficiently used. By setting the storage capacity determined on the basis of the image information amount of the first document as the size of the reference document, the operation of setting a specific value as the size of the reference document is made unnecessary and the construction can be simplified. Since the setting operation of the operator becomes unnecessary, the convenience can be improved.

The invention relates to an image forming apparatus comprising:

reading means for reading an image on a document;

document transporting means for sequentially transporting documents to the reading means;

image forming means for forming an image on a sheet of recording paper;

recording paper transporting means for transporting the sheet of recording paper; and storing means for storing image information read by the reading means, the apparatus comprising control means for allowing images drawn on both sides of each document to be sequentially read by the reading means and formed on both sides of each sheet of recording paper by the image forming means, the control means allowing an image on the surface of a document to be read by the reading means and stored into the storing means, allowing an image on the back of the document to be read by the reading means and formed on one of the surfaces of a sheet of recording paper by the image forming means, allowing the sheet of recording paper to be turned upside down by the recording paper transporting means, allowing the image stored in the storing means to be read out and formed on the other surface of the sheet of recording paper by the image forming means, and allowing the sheet of recording paper to be transported with the other surface facing downward by the recording paper transporting means.

According to the invention, an image on the surface of a document is read and stored. Subsequently, an image on the back of the document is read and formed on one of the surfaces of a sheet of recording paper. Further, the sheet of recording paper is turned upside down, and the stored image is read out and formed on the other surface of the sheet of recording paper. Finally, the sheet of recording paper is transported with the other surface facing downward. Accordingly, at the time of execution in the D-D mode, the order of pages of the sheets of recording paper after image formation becomes 1, 2, 3, 4, . . . . Thus, the sheets of recording paper can be ejected in accordance with the order of pages.

According to the invention, an image on one of the surfaces of a document is read and stored, an image on the other surface of the document is read and formed on one of the surfaces of a sheet of recording paper, the sheet of recording paper is turned upside down, the stored image is read out and formed on the other surface of the sheet of recording paper, and finally, the sheet of recording paper is transported with the other surface facing downward. Thus, the sheets of recording paper can be ejected accurately in accordance with the order of pages at the time of execution in the D-D mode.

In the invention it is preferable that the apparatus further comprises:

detecting means for detecting the size of the document;

determining means for comparing the size of the detected document with the size of a predetermined reference document and determining whether the detected document is larger or not; and thinning means for thinning out the read image information when the detected document is larger on the basis of the determination result and storing the resultant information into the storing means.

According to the invention, at the time of execution in the D-D mode, when it is determined that the document is larger than the predetermined reference document, that is, when it is determined that all of the read image information cannot be stored into the storing means, the read image information is thinned out and stored. Consequently, the sheets of recording paper can be certainly arranged in accordance with the order of pages irrespective of the size of the document, namely, the amount of image information to be read.

According to the invention, at the time of execution in the D-D mode, when the document is larger than the predetermined reference document, the read image information is thinned out and stored. Thus, the sheets of recording paper can be certainly arranged in accordance with the order of pages irrespective of the size of the document.

In the invention it is preferable that the storage capacity of the storing means is determined on the basis of the amount of the image information read from the surface of the first document.

According to the invention, at the time of execution in the D-D mode, the storage capacity of the storing means for storing image information is determined on the basis of the amount of image information on the surface of the first document. Consequently, the subsequent image information can be certainly stored and the storing means can be efficiently used.

The storage capacity determined on the basis of the amount of the image information on the surface of the first document may be set as the size of the predetermined reference document. Consequently, the operation of setting a specific value as the size of the reference document is made unnecessary and the construction is simplified. The setting operation of the operator is also made unnecessary, thereby enabling the convenience to be improved.

According to the invention, at the time of execution in the D-D mode, the storage capacity of the storing means is determined on the basis of the amount of the image information on the surface of the first document, so that the subsequent image information can be certainly stored and the storing means can be efficiently used. By setting the storage capacity determined on the basis of the amount of the image information on the surface of the first document as the size of the reference document, the operation of setting a specific value as the size of the reference document is made unnecessary and the construction can be simplified. The setting operation of the operator is also made unnecessary, thereby enabling the convenience to be improved.

The invention relates to an image forming method of sequentially reading images drawn on one sides of documents and forming the images on both sides of a sheet of recording paper, comprising:

a step of reading and storing an image of an odd-numbered document;

a step of reading an image of an even-numbered document and forming the image on one of the surfaces of a sheet of recording paper;

a step of turning the sheet of recording paper upside down;

a step of reading out the stored image and forming the image on the other surface of the sheet of recording paper; and a step of transporting the sheet of recording paper with the other surface facing downward.

According to the invention, by the image forming method, the sheets of recording paper can be arranged in accordance with the order of pages at the time of image formation in the SD mode.

According to the invention, the image forming method by which the effect is obtained in the S-D mode can be provided.

The invention relates to an image forming method of sequentially reading images drawn on both sides of a document and forming the images on both sides of a sheet of recording paper, comprising:

a step of reading and storing an image on the surface of a document;

a step of reading an image on the back of the document and forming the image on one of the surfaces of the sheet of recording paper;

a step of turning the sheet of recording paper upside down;

a step of reading out the stored image and forming the image on the other surface of the sheet of recording paper; and a step of transporting the sheet of recording paper with the other surface facing downward.

According to the invention, by the image forming method, sheets of recording paper can be arranged in accordance with the order of pages at the time of the image formation in the D-D mode.

According to the invention, the image forming method by which the effect is obtained in the D-D mode can be provided. Additionally, according to the invention, by providing only one memory for one page it is achieved without any consideration of image data readout sequence to form images on both sides of sheets of recording paper in the S-D mode and D-D mode and eject the sheets of recording paper in order of page. No mechanism for reversing the ejected sheets of recording paper is required, which results in reduction in manufacturing costs. A vicinity of a sheet ejection unit can be constituted compact, whereby the apparatus can be reduced in size as a whole.

BRIEF DESCRIPTION OF THE DRAWINGS

Other and further objects, features, and advantages of the invention will be more explicit from the following detailed description taken with reference to the drawings wherein:

FIG. 2 is a diagram showing a document transport part 2a in the copying machine 1a;

FIG. 3 is a diagram showing an image forming part 4 and a recording paper transport part in the copying machine 1a;

FIG. 4 is a block diagram of the copying machine 1a;

FIG. 5 is a flowchart showing an image forming operation of the copying machine 1a;

FIG. 6 is a flowchart showing the image forming operation of the copying machine 1a;

FIG. 7 is a flowchart showing the image forming operation of the copying machine 1a;

DETAILED DESCRIPTION OF THE PREFERRED EMBODIMENTS

Figure 1:
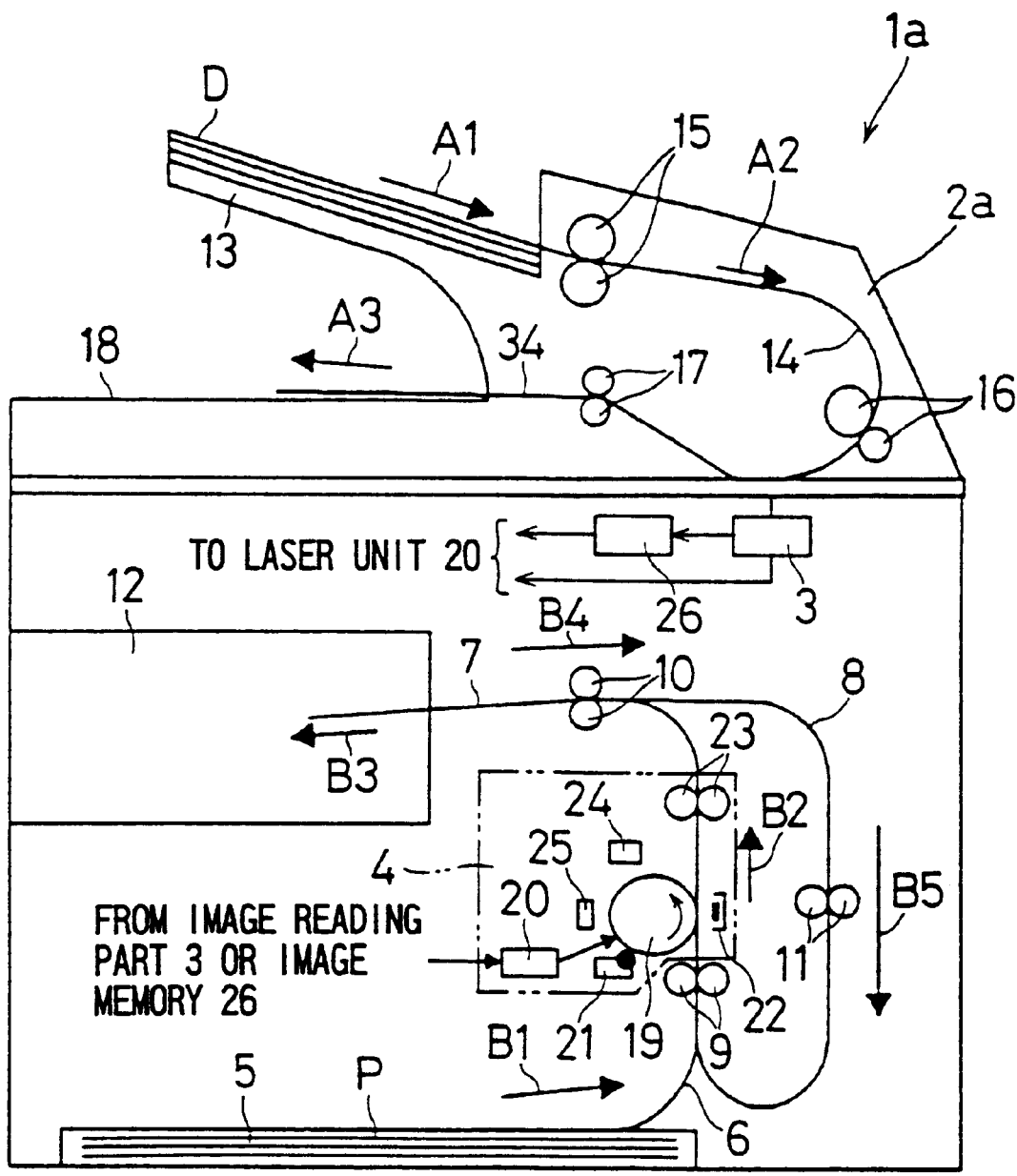
FIG. 1 is a diagram showing a copying machine 1a which operates in the S-D mode as a first embodiment of the invention.

Now referring to the drawings, preferred embodiments of the invention are described below.

Figure 2:
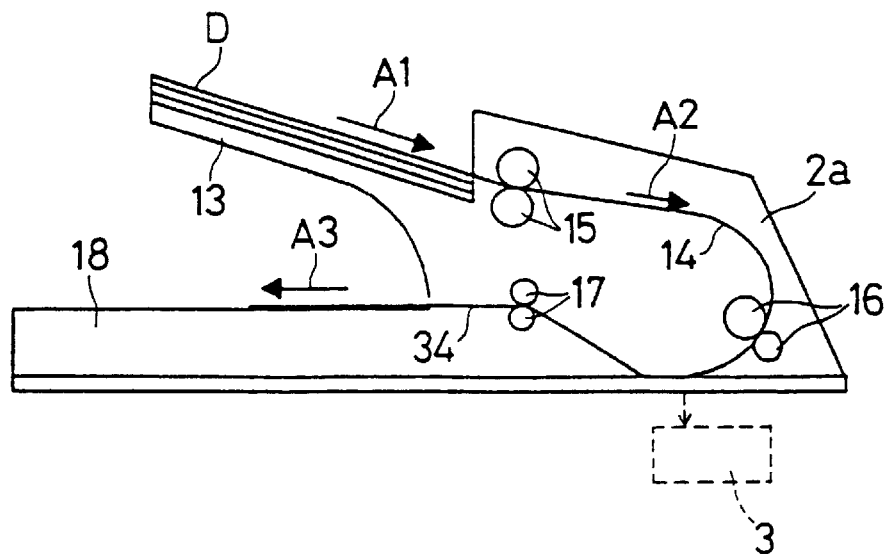
Figure 3:
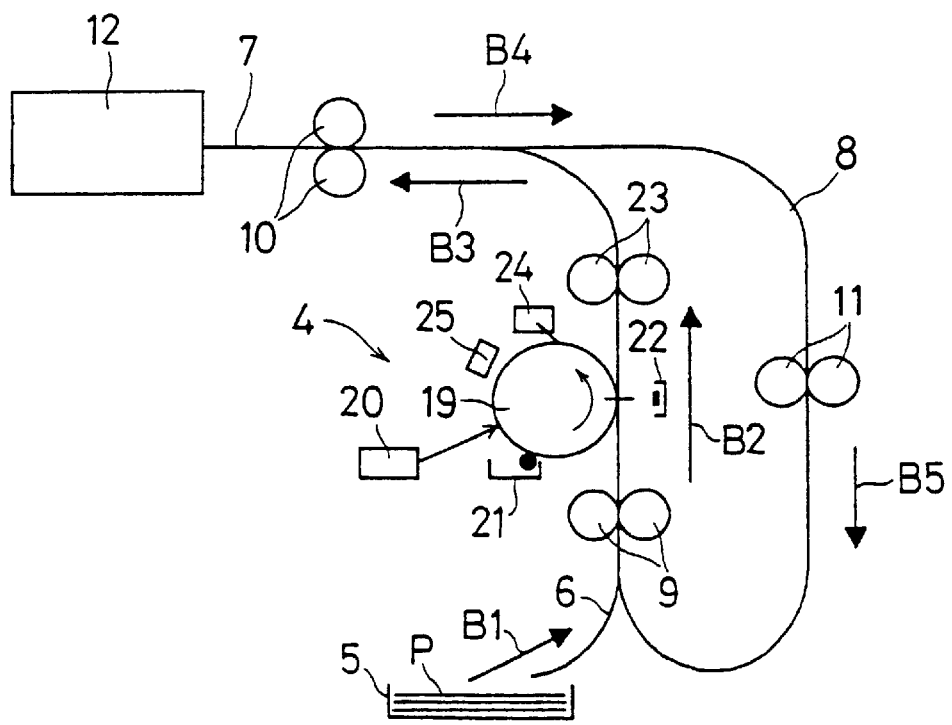

FIG. 1 is a diagram showing a copying machine 1a which operates in the S-D mode as a first embodiment of the invention. The copying machine 1a comprises, broadly, an image reading part 3, a document transport part 2a, an image forming part 4, and a recording paper transport part. FIG. 2 is a diagram showing the document transport part 2a. FIG. 3 is a diagram showing the image forming part 4 and the recording paper transport part.

The document transport part 2a is to transport a document D to the image reading part 3 and is arranged in the upper part of the copying machine 1a. The document transport part 2a comprises a paper feeding tray 13, a document transport path, transport rollers, and an output tray 18. In the document transport part 2a, the paper feeding tray 13 is arranged in the upper part and the output tray 18 is disposed in the lower part. The document transport path is provided between the paper feeding tray 13 and the output tray 18.

The image reading part 3 is provided so as to face the document transport path at some midpoint of the path. Specifically, the document transport path is comprised of a path 14 for feeding the document D to the image reading part 3 and a path 34 for ejecting the document D from the image reading part 3. The transport rollers are, specifically, paper feeding rollers 15 and resist rollers 16 which are disposed along the path 14 and paper ejecting rollers 17 disposed along the path 34. The rollers 15 to 17 are pairs of rollers each for sandwiching and conveying the document D.

Documents D are stacked on the paper feeding tray 13 and an image is drawn on one side of each of the documents D. The documents D are placed on the paper feeding tray 13 with the image formation surface facing upward so that the image formation surface faces the reading part 3. The documents D are sequentially fed from the top, fed by the paper feeding rollers 15, and conveyed to the image reading part 3 at a predetermined timing by the resist rollers 16. The document D whose image is read by the image reading part 3 is fed to the output tray 18 by the paper ejecting rollers 17 and sequentially stacked from the lower part. The document D is placed on the output tray 18 with the image formation surface facing downward. The document D is transported in the order of arrows A1, A2, and A3. When the document D is ejected, the next document D is supplied.

The image reading part 3 for reading an image of the document D reads image information by emitting light onto the image formation face of the document. The read image information is supplied to a laser unit 20 in the image forming part 4 either directly or after being stored in an RAM (Random Access Memory) 26 once.

The image forming part 4 is to print the read image onto the sheet of recording paper P and comprises a photosensitive drum 19, the laser unit 20, a developing unit 21, a transfer unit 22, a fixing unit 23, a cleaning unit 24 and a charging unit 25. The laser unit 20 irradiates the surface of the photosensitive drum 19 which can rotate in a predetermined direction with a laser beam to form an electrostatic latent image based on the image information supplied directly or via the RAM 26 from the image reading part 3.

The developing unit 21 allows developing powders such as toner to be adsorbed on the electrostatic latent image, thereby developing and visualizing the image. The transfer unit 22 is disposed so as to face the photosensitive drum 19 over a recording paper transport path and transfers the developing powders onto the sheet of recording paper P transported by the recording paper transport part. The fixing unit 23 fixes the transferred developing powders onto the sheet of recording paper P by heat or pressure. The cleaning unit 24 removes the developing powders which are residual on the surface of the photosensitive drum 19 after the transfer operation. The charging unit 25 charges the surface of the photosensitive drum 19 to a predetermined potential. Around the photosensitive drum 19, the developing unit 21, the transfer unit 22, the cleaning unit 24, and the charging unit 25 are arranged in this order along the rotating direction of the photosensitive drum 19 with respect to the irradiation position of the laser beam from the laser unit 20 as a reference.

In the recording paper transport part for transporting the sheet of recording paper P to the image forming part 4, a paper feeding cassette 5, a recording paper transport path, transport rollers, and an output tray 12 are provided. The paper feeding cassette 5 is placed in the lower part of the copying machine 1a, the output tray 12 is disposed above the paper feeding cassette 5, and the recording paper transport path extends from the paper feeding cassette 5 to the output tray 12. The recording paper transport path is, specifically, comprised of a path 6 for feeding the sheet of recording paper P into the image forming part 4, a path 7 for ejecting the sheet of recording paper P from the image forming part 4, and a path 8 for turning the sheet of recording paper P ejected from the image forming part 4 upside down and feeding it again into the image forming part 4.

Specifically, the transport rollers are comprised of resist rollers 9, reversible rollers 10, and transport rollers 11. The rollers 9 to 11 are pairs of rollers each sandwiching and transporting the sheet of recording paper P. The resist rollers 9 are disposed along the path 6, the reversible rollers 10 are disposed along the path 7, and the transport rollers 11 are disposed along the path 8.

The sheets of recording paper P are stacked on the paper feeding cassette 5. The sheets of recording paper P are sequentially fed from the top to the image forming part 4 by the resist rollers 9 at predetermined timings.

In case of forming an image on one of the surfaces of the sheet of recording paper P (single-side printing), the sheet of recording paper P on which an image is printed by the image forming part 4 is ejected from the image forming part 4 by the reversible roller 10 which rotates forward and sequentially stacked up on the output tray 12. The sheet of recording paper P is placed on the output tray 12 with the image formation surface facing downward. In the single-side printing, the sheet of recording paper P is transported in accordance with the order of arrows B1, B2, and B3.

In case of forming images on both surfaces of the sheet of recording paper P (double-side printing), the sheet of recording paper P having an image printed on one of the surfaces by the image forming part 4 is ejected from the image forming part 4 by the reversible roller 10 which rotates forward and stopped in a state where the rear end in the transport direction of the sheet of recording paper P is sandwiched. After that, the sheet of recording paper P is fed to the third path 8 by the reversible roller 10 which rotates reversely, turned upside down, and fed again into the image forming part 4. The sheet of recording paper P having an image printed on the other surface of the sheet of recording paper P by the image forming part 4 is ejected from the image forming part 4 and placed on the output tray 12 in a manner similar to the single-side printing. The sheet of recording paper P is placed on the output tray 12 with the other surface on which the image is formed lastly facing downward. At the time of the double-side printing, the sheet of recording paper P is fed in accordance with the order of arrows B1, B2, B3, B4, B5, B2, and B3.

Figure 4:
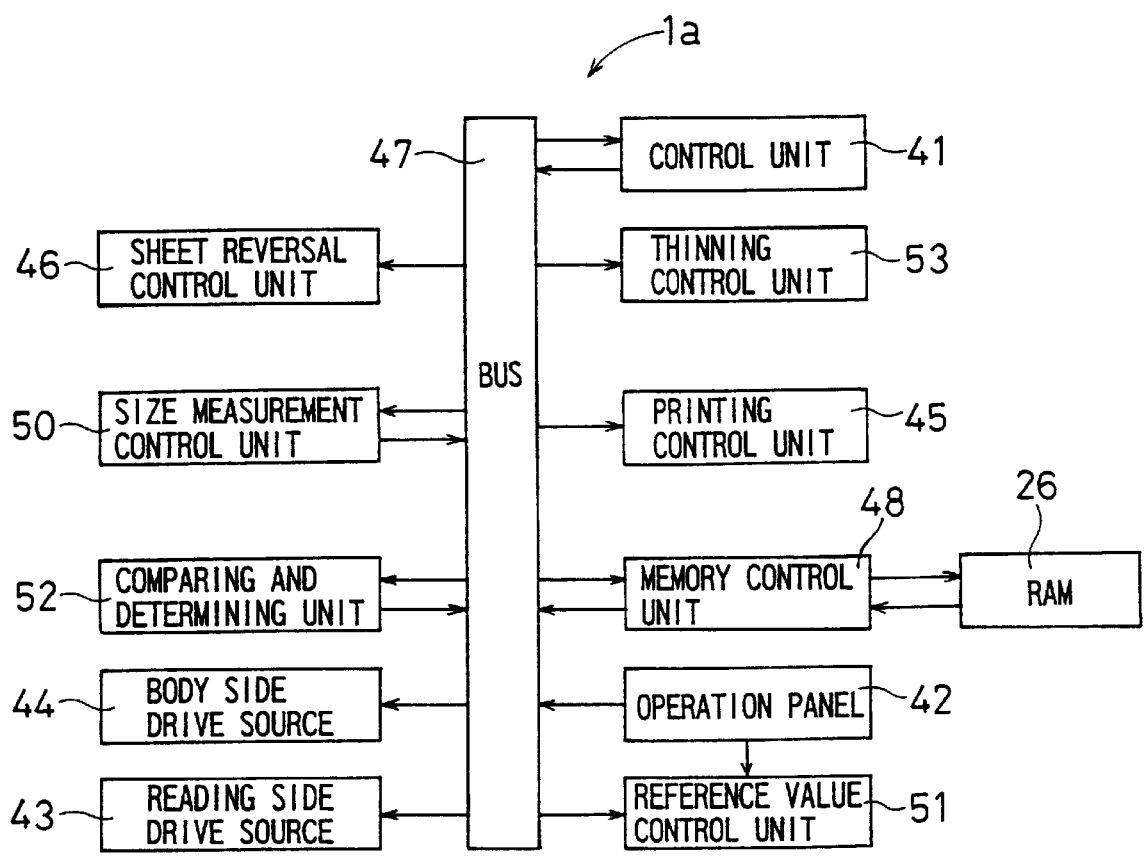

FIG. 4 is a block diagram of the copying machine 1a. The copying machine 1a comprises a control unit 41, an operation panel 42, a reading side drive source 43, a body side drive source 44, a printing control unit 45, a sheet reversal control unit 46, a memory control unit 48, a size measurement control unit 50, a reference value control unit 51, a comparing and determining unit 52, and a thinning control unit 53. Those components are connected via a bus line 47.

The control unit 41 realized by a CPU or the like controls the operation of the whole copying machine. In response to designation of start of copy from the operation panel 42, the reading side drive source 43 is driven. The reading side drive source 43 drives the rollers 15 to 17 of the document transport part 2a. The document D is accordingly fed to the image reading part 3 and an image is read. The read image information is either directly given to the image forming part 4 by the control of the printing control unit 45 or given to the RAM 26 via the memory control unit 48.

In response to the designation of start of copy from the operation panel 42, the body side drive source 44 is driven. The body side drive source 44 drives the rollers 9 to 11 of the recording paper transport part. The sheet of recording paper P is accordingly fed to the image forming part 4. The printing control unit 45 controls the image forming operation of the image forming part 4, thereby printing the image information supplied from the image reading part 3 or the RAM 26 onto the sheet of recording paper P. The sheet inversion control unit 46 controls an operation of turning the sheet of recording paper P upside down to print images on both faces of the sheet of recording paper P.

From the operation panel 42, not only the start of copy, but also execution of various operations such as interruption and stop of copy is designated by the operator.

The memory control unit 48 controls an operation of storing image information into the connected RAM 26 and an operation of reading out the image information from the RAM 26. The RAM 26 stores image information of about one page.

The size measurement control unit 50 detects the size of the document D. For example, the length in the document feeding direction is measured and detected by an optical sensor or an actuator. The comparing and determining unit 52 compares the size of the document D detected by the size measurement control unit 50 with reference size information preliminarily stored in the reference value control unit 51 and determines whether the detected document D is larger than the reference size information or not. The reference value control unit 51 stores and manages the reference size information which is set by an inputting operation of the operator from the operation panel 42 or automatically set as will be described hereinlater. The thinning control unit 53 thins out read image information when the size of the detected document D is larger than the reference size controlled by the reference value control unit 51 on the basis of the determination result of the comparing and determining unit 52. After the image information is thinned out, the resultant image information is stored into the RAM 26.

Figure 5:
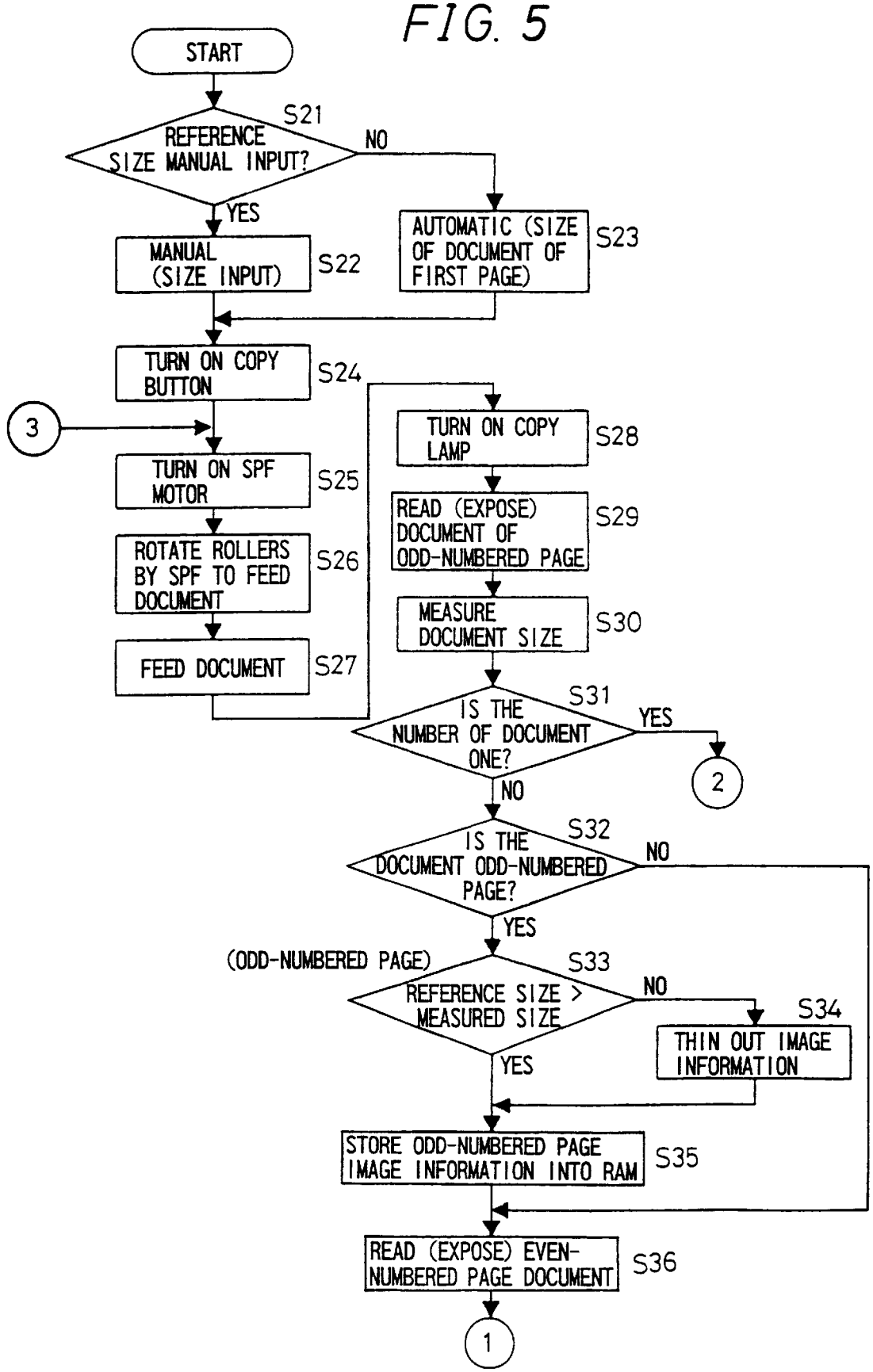
Figure 6:
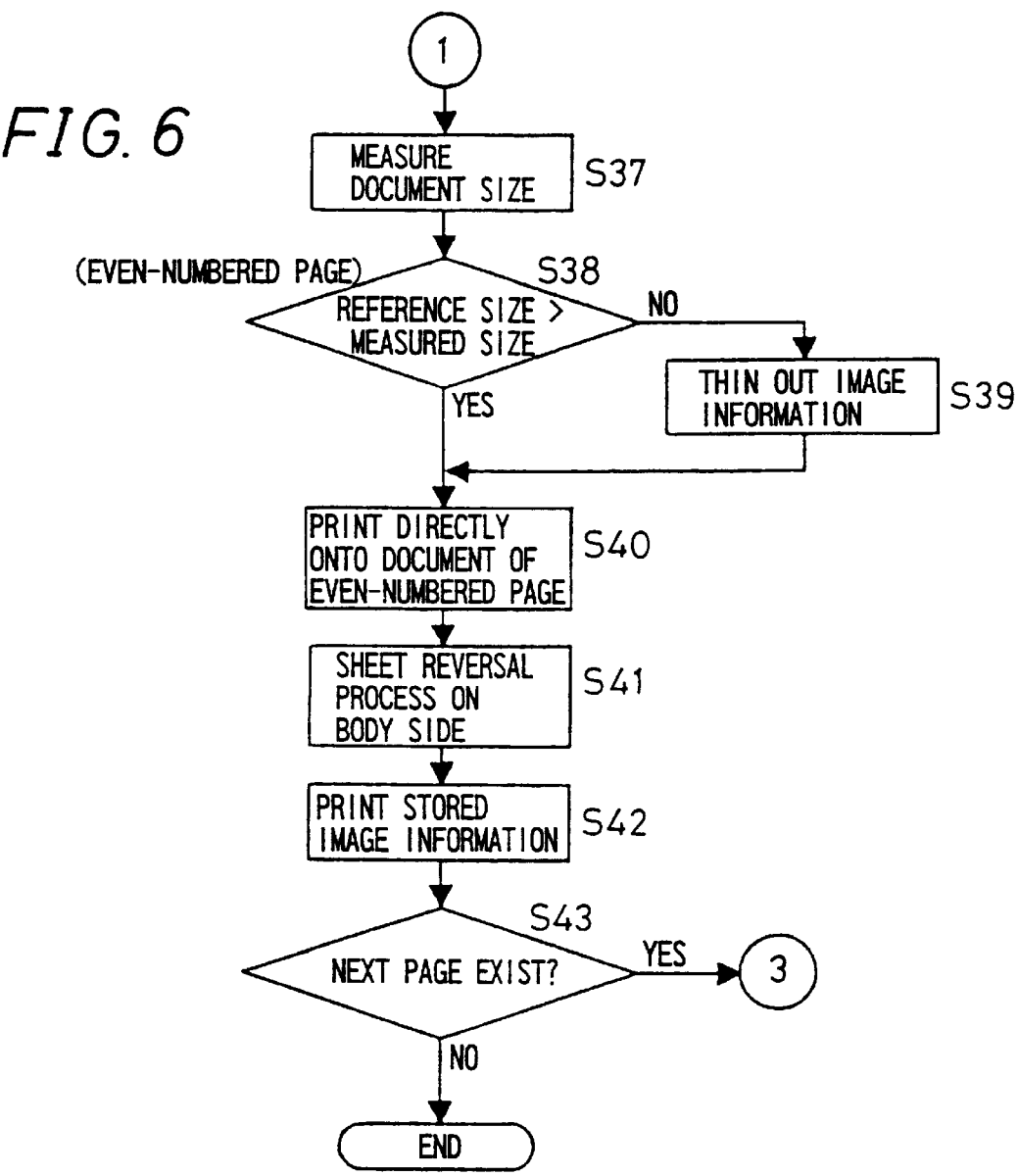
Figure 7:
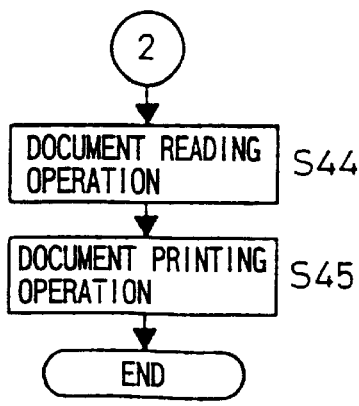

FIGS. 5 to 7 are flowchart showing the image forming operation of the copying machine 1a. When the image forming operation is started, the routine advances to step S21, the control unit 41 determines whether it is set so as to manually input the reference size information or not. When the manual input is set, the routine advances to step S22. In step S22, the reference size information is inputted from the operation panel 42 and set. In this case, the size which does not exceed the storage capacity of the RAM 26 is inputted. When the manual input is not set, the routine progresses to step S23 where the size of the detected first document D is automatically set as reference size information as will be described hereinlater. When the operation of step S22 or S23 is finished, the routine advances to step S24. In step S24, a copy button or the like in the operation panel 42 is pressed and turned "ON", thereby designating a start of copy.

In step S25, when the control unit 41 turns on an SPF motor of the reading side drive source 43, the rollers 15 to 17 for transporting the document D rotate in step S26, the document D is fed to the image reading part 3 in step S27, and a copy lamp is turned on in step S28.

In step S29, the image reading part 3 irradiates the image formation face of the document D of an odd-numbered page with a laser beam, and the image formation face is exposed to the laser beam. In step S30, the size measurement control unit 50 measures the size of the document D. In step S31, the control unit 41 determines whether the total number of printing sheets is zero or one. When it is zero or one, the routine advances to step S44 where the operation of reading an image on the document D is performed. In step S45, the printing operation of the read image onto the sheet of recording paper P is carried out and then the image forming operation is finished. When the total number of printing sheets is not zero nor one in step S31, that is, when it is two or more, the routine advances to step S32.

In step S32, the control unit 41 determines whether the page of the document from which the image is read is an odd-numbered page or not. In case of the odd-numbered page, the routine advances to step S33. When the page is not the odd-numbered page, the routine advances to step S36. In step S33, the comparing and determining unit 52 compares the reference size information with the size of the measured document D and determines whether the reference size is larger or not. When the reference size is larger, the routine advances to step S35. When the reference size is not larger, the routine advances to step S34 where the read image information is thinned out by the thinning control unit 53 and then to step S35. In step S35, the image information of the odd-numbered page is stored in the RAM 26.

In step S36, the image reading part 3 irradiates the image forming face of the document D of an even-numbered page with a laser beam and the image forming face is exposed. In step S37, the size measurement control unit 50 measures the size of the document D. Instep S38, the comparing and determining unit 52 compares the reference size information with the size of the measured document D, thereby determining whether the reference size is larger or not. When the reference size is larger, the routine advances to step S40. When the reference size is not larger, the routine progresses to step S39 where the read image information is thinned out by the thinning control unit 53 and then advances to step S40.

In step S40, the image information of the even-numbered page is printed on one of the surfaces of the sheet of recording paper P by the control of the printing control unit 45. In step S41, the sheet of recording paper P is fed to the path 8 and turned upside down by the sheet reversal control unit 46. In step S42, the printing control unit 45 reads out the image information stored in the RAM 26 and allows the image information to be printed on the other surface of the sheet of recording paper P. In step S43, the control unit 41 determines whether there is the document of the next page or not. When there is the document of the next page, the routine is returned to step S25. When there is no document of the next page, the image forming operation is finished. In such a manner, the image is read from the single-side printed document D and can be printed on both- sides of the sheet of recording paper P.

Figures 8A, 8B:
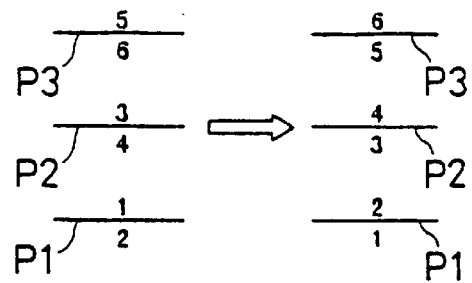
FIGS. 8A and 8B are diagrams each showing the order of pages of sheets of recording paper P after printing.

FIGS. 8A and 8B are diagrams each showing the order of pages of the printed sheets of recording paper P. Three sheets of recording paper P1 to P3 will be viewed as an example. In the related arts, there is an inconvenience such that the printed faces of the sheets of recording paper P are not arranged in order of page. That is, as shown in FIG. 8A, the second sheet of recording paper P2 is stacked on the first sheet of recording paper P1, and the third sheet of recording paper P3 is stacked on the second sheet of recording paper P2. In the sheets of recording paper P1 to P3, the odd-numbered page is formed on the surface (the top face in FIG. 8A) side of each sheet of recording paper and the even-numbered page is formed on the back (the under face in FIG. 8A) of each sheet of recording paper. The order of pages is, therefore, 2, 1, 4, 3, 6, and 5.

In the embodiment, however, the printing faces of the printed sheets of recording paper P are arranged in order of page. Specifically, as shown in FIG. 8B, the second sheet of recording paper P2 is stacked on the first sheet of recording paper P1 and the third sheet of recording paper P3 is stacked on the second sheet of recording paper P2. In the sheets of recording paper P1 to P3, the odd-numbered page is formed on the back (the under face in FIG. 8B) side of each sheet of recording paper and the even-numbered page is formed on the surface (the top face in FIG. 8B) side of the sheet of recording paper. The order of page becomes, therefore, 1, 2, 3, 4, 5, and 6. Consequently, according to the invention, in the copying machine 1a operating in the S-D mode, the sheets of recording paper after image formation can be accurately arranged in order of page.

Figure 9:
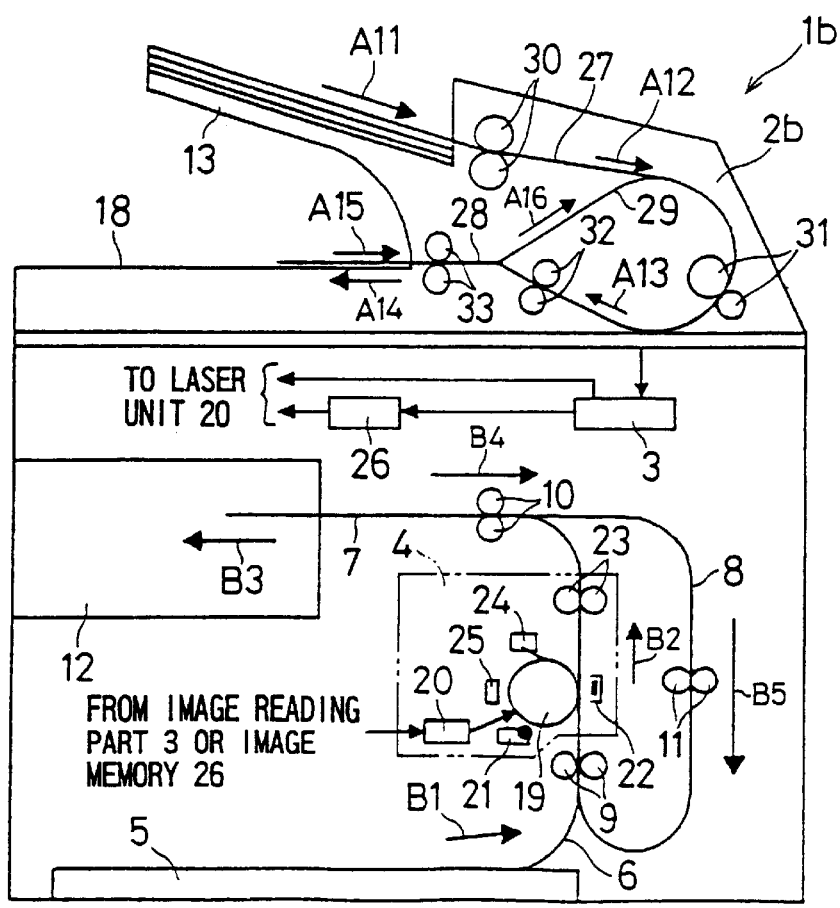
FIG. 9 is a diagram showing a copying machine 1b which is operated in the D-D mode as a second embodiment of the invention.
Figure 10:
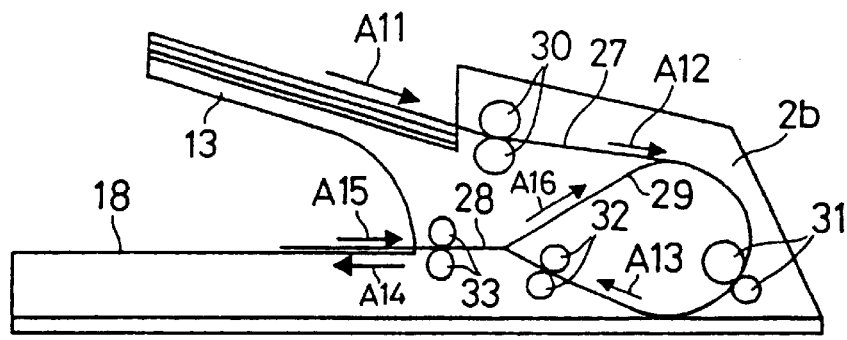
FIG. 10 is a diagram showing a document transport part 2b in the copying machine 1b.

FIG. 9 is a diagram showing a copying machine 1b which operates in the D-D mode as a second embodiment of the invention. The copying machine 1b has a document transport part 2b in place of the document transport part 2a of the copying machine 1a. Except for the above, the copying machine 1b is constructed in a manner similar to the copying machine 1a. The same reference numerals are designated to the same components and their description is omitted here. FIG. 10 is a diagram showing the document transport part 2b.

The document transport part 2b is different from the document transport part 2a especially with respect to the document transport path. Except for this, the document transport part 2b is constructed in a manner similar to the document transport part 2a. At some midpoint in the document transport path extending from the paper feeding tray 13 to the output tray 18, the image reading part 3 is disposed so as to face the path. Specifically, the document transport path is comprised of a path 27 for feeding the document D to the image reading part 3, a path 28 for ejecting the document D from the image reading part 3, and a path 29 for feeding again the ejected document D to the image reading part 3. The transport rollers are, specifically, paper feeding rollers 30, resist rollers 31, and transport rollers 32 which are arranged along the path 27 and paper ejecting rollers 33 disposed along the path 28. The rollers 30 to 33 are pairs of rollers each for sandwiching and feeding the document D. The paper ejecting rollers 33 are reversely rotatable.

On the paper feeding tray 13, the documents D each having images on both faces are stacked and placed. Each document D is stacked with the odd-numbered page facing upward. The documents D are sequentially fed from the top, transported by the paper feeding rollers 30, and transported to the image reading part 3 at a predetermined timing by the resist rollers 31. The document D from which the image on the surface is read by the image reading part 3 is ejected to the output tray 18 by the transport rollers 32 and the paper ejecting rollers 33 rotating forward and stopped in a state where the rear end part in the feeding direction of the document is sandwiched by the paper ejecting rollers 33. After that, the document D is fed to the path 29 by the paper ejecting rollers 33 which rotate reversely, turned upside down, and again fed to the image reading part 3. The document D from which the image on the back surface is read by the image reading part 3 is ejected to the output tray 18 in a manner similar to the time of the reading of the image on the surface, and the documents D are sequentially stacked up. The document D is transported in the order of arrows A11, A12, A13, A14, A15, A16, A13, and A14. When the document D is ejected, the next document D is fed.

Figure 11:
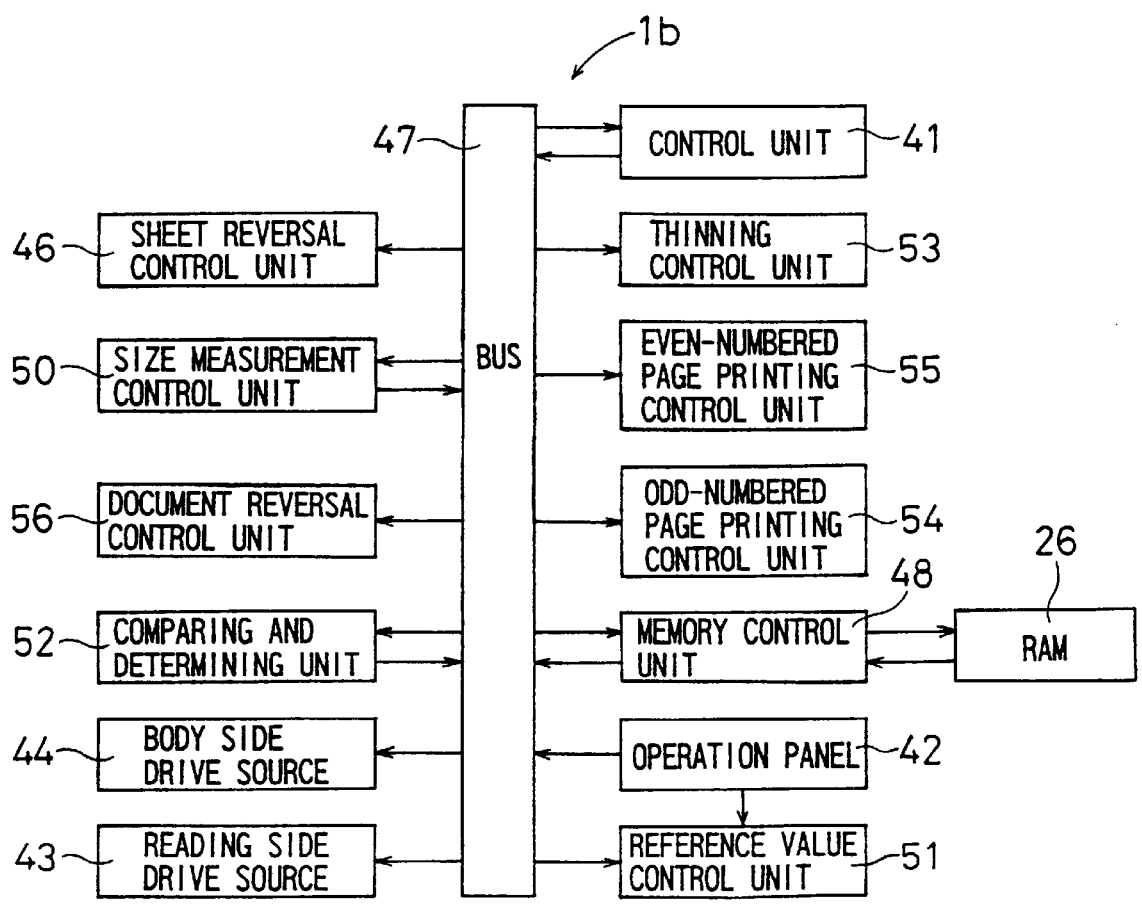
FIG. 11 is a block diagram of the copying machine 1b.

FIG. 11 is a block diagram of the copying machine 1b. The copying machine 1b comprises an odd-numbered page printing control unit 54, an even-numbered page printing control unit 55, and a document reversal control unit 56 in place of the printing control unit 45 in the copying machine 1a. The same reference numerals are designated to components similar to those in the copying machine 1a and their description is omitted here. The image information read by the image reading part 3 is either supplied directly to the image forming part 4 by the odd-numbered page printing control unit 54 or the even-numbered page printing control unit 55 or supplied to the RAM 26 via the memory control unit 48. The sheet of recording paper P is fed to the image forming part 4 by the odd-numbered page printing control unit 54 or the even-numbered page printing control unit 55. Each of the printing control units 54 and 55 controls the image forming operation of the image forming part 4 and prints the image information supplied from the image reading part 3 or the RAM 26 onto the sheet of recording paper P. The document reversal control unit 56 turns the document D upside down in order to read the images drawn on both faces.

Figure 12:
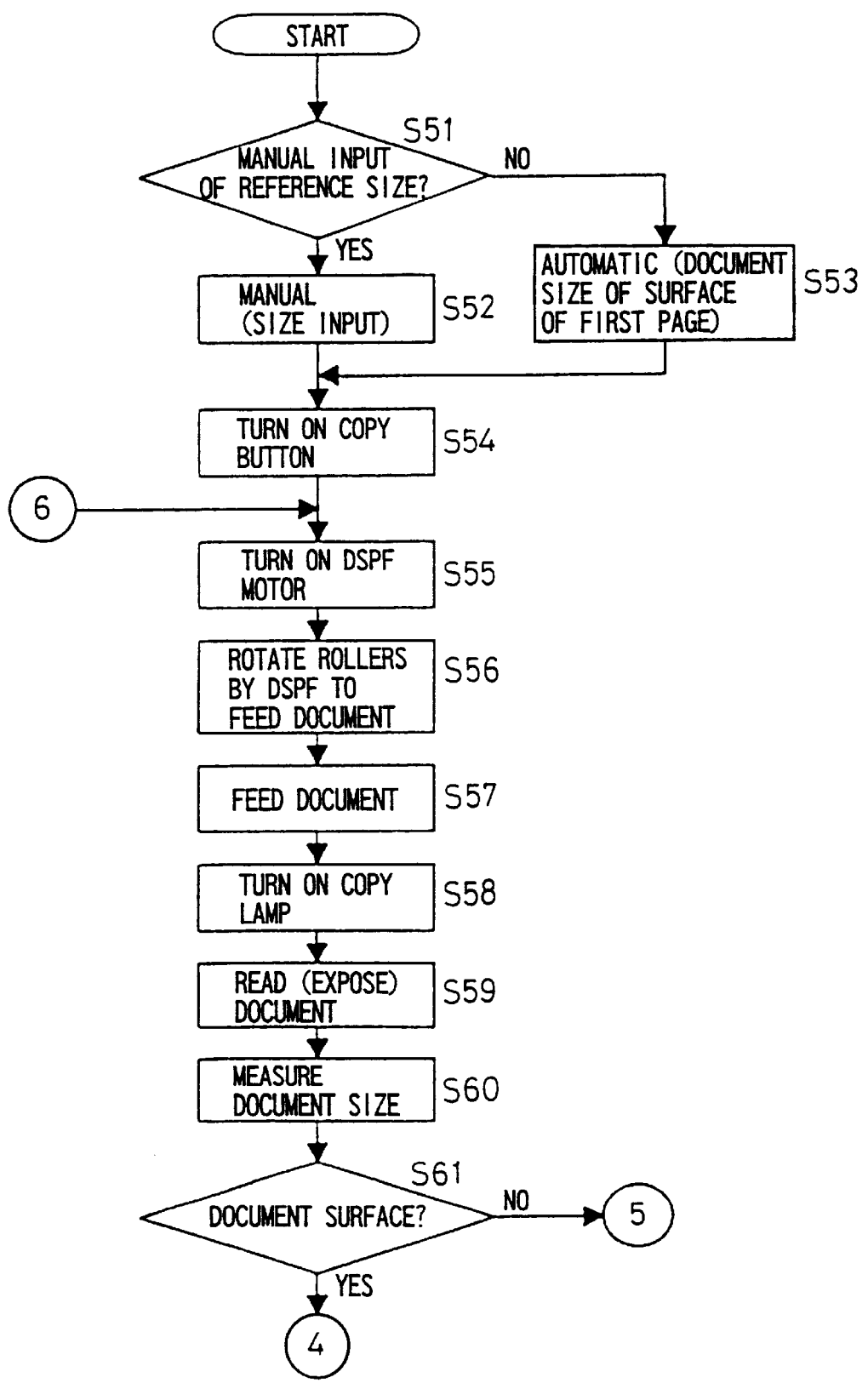
FIG. 12 is a flowchart showing an image forming operation of the copying machine 1b.
Figure 13:
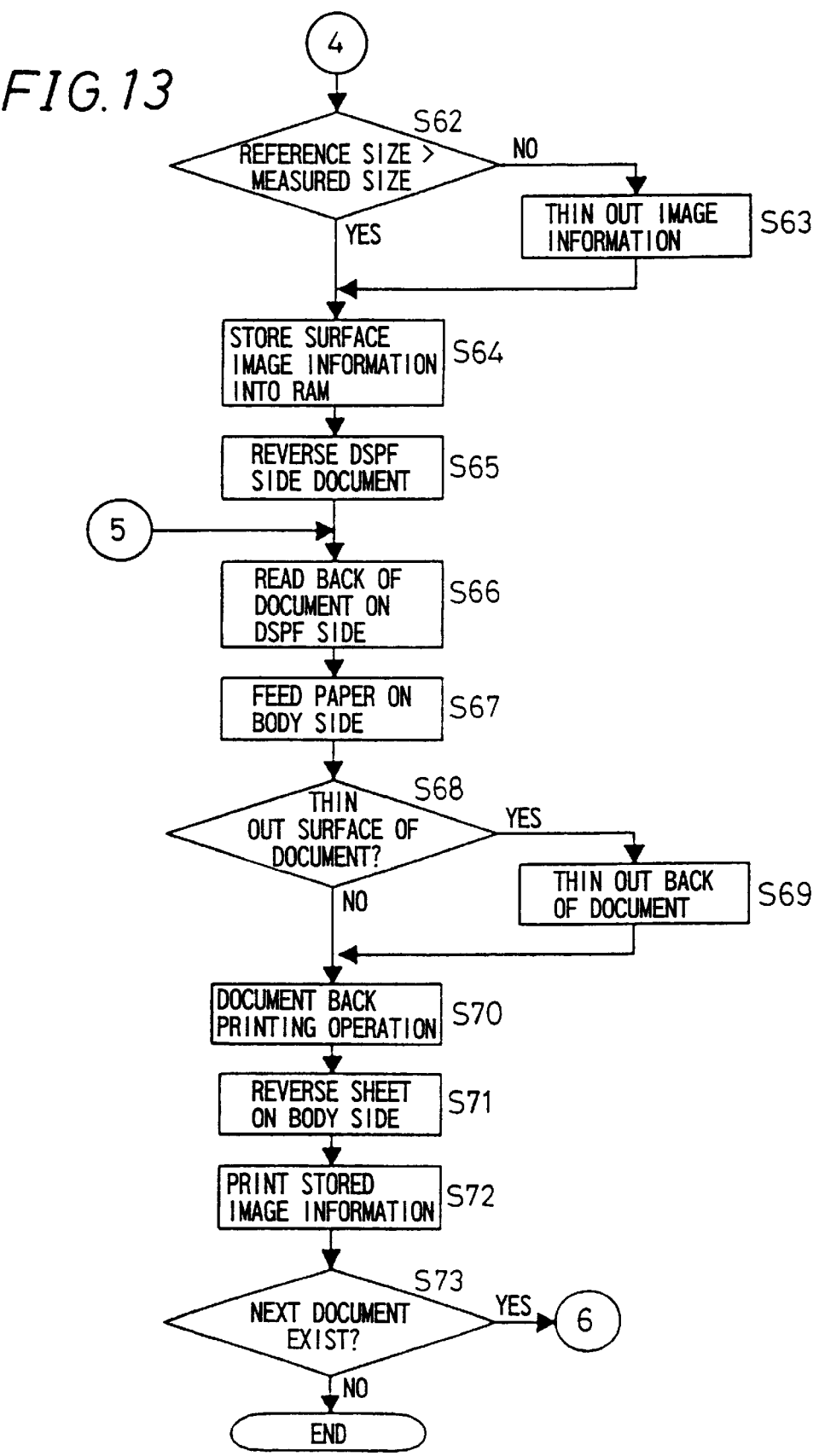
FIG. 13 is a flowchart showing an image forming operation of the copying machine 1b.

FIGS. 12 and 13 are flowchart showing the image forming operation of the copying machine 1b. When the image forming operation is started, the routine advances to step S51 where the control unit 41 determines whether the manual input of the reference value size information is set or not. When the manual input is set, the routine advances to step S52. In step S52, the reference size information is inputted from the operation panel 42 and set. In this case, the size of an amount which does not exceed the storage capacity of the RAM 26 is inputted. When the manual input is not set, the routine advances to step S53 where the size of the surface of the first detected document D is automatically set as reference size information as will be described hereinlater. When the operation of step S52 or S53 is finished, the routine advances to step S54. In step S54, a copy button or the like in the operation panel 42 is pressed and turned on, thereby designating the start of copy.

In step S55, when the control unit 41 turns on a DSPF motor of the reading side drive source 43, the rollers 30 to 33 for feeding the document D rotate in step S56, the document D is fed to the image reading part 3 in step S57, and a copy lamp is turned on in step S58.

Instep S59, the image reading part 3 irradiates the image formation face of the document D with a laser beam and the image formation face is exposed. In step S60, the size measurement control unit 50 measures the size of the document D. In step S61, the control unit 41 determines whether or not the face is the surface of the document from which an image is read. When it is the surface, the routine advances to step S62. When it is not the surface, the routine advances to step S66.

In step S62, the comparing and determining unit 52 compares the reference size information with the size of the measured document D and determines whether the reference size is larger than the size of the document D or not. When the reference size is larger, the routine advances to step S64. When the reference size is not larger, the routine advances to step S63 where the read image information is thinned out by the thinning control unit 53 and then advances to step S64. In step S64, the image information on the surface is stored into the RAM 26.

In step S65, the document D is fed to the path 29 and turned upside down by the document reversal control unit 56. In step S66, the image reading part 3 irradiates the back of the document D with a laser beam to thereby exposure it and reads the image. In step S67, the sheet of recording paper P is fed to the image forming part 4. In step S68, the control unit 41 determines whether the image information on the surface of the document D has been thinned out or not. When the image information on the surface has been thinned out, the routine advances to step S69 where the image information on the back is thinned out and then the routine progresses to step S70. When the image information on the surface has not been thinned out, the routine immediately advances to step S70.

In step S70, the image on the back of the document D is printed on one of the surfaces of the sheet of recording paper P. In step S71, the sheet of recording paper P is fed to the path 8 and turned upside down by the sheet reversal control unit 46. In step S72, the image information stored in the RAM 26 is read out and printed on the other surface of the sheet of recording paper P. In step S73, the control unit 41 determines whether there is the next document or not. When there is the next document, the routine is returned to step S55. When there is not the next document, the image forming operation is finished. In such a manner, the images can be read from the both-side printed document D and printed on both sides of the sheet of recording paper P.

In the embodiment as well, the printed faces of the sheets of recording paper P are arranged in accordance with the page order. Specifically, as shown in FIG. 8B, the second sheet of recording paper P2 is stacked on the first sheet of recording paper P1, and the third sheet of recording paper P3 is stacked on the second sheet of recording paper P2. In the sheets of recording paper P1 to P3, the odd-numbered page is formed on the back (the under face in FIG. 8B) side of each sheet of recording paper and the even-numbered page is formed on the surface (the top face in FIG. 8B) side of each sheet of recording paper. The order of pages becomes, therefore, 1, 2, 3, 4, 5, and 6. According to the embodiment, therefore, the sheets of recording paper after image formation can be accurately arranged in accordance with the order of pages in the copying machine 1b operating in the D-D mode.

In the first and second embodiments, the case where it is determined that the document D is larger than the reference size is the case where all of read image information cannot be stored in the RAM 26. In such a case, the read image information is thinned out and stored into the RAM 26. Consequently, regardless of the size of the document D, namely, irrespective of the amount of the image information to be read, the sheets of recording paper P can be certainly arranged in accordance with the order of page.

Further, by determining the storage capacity of the RAM 26 on the basis of the amount of the image information of the first document D or the amount of the image information on the surface of the first document D, for example, when the image information amount of the second document is larger than that of the first document, the image information of the second document can be thinned out. Thus, the subsequent image information can be certainly stored and the RAM 26 can be efficiently used. Since the operation of setting a specific value as reference size information is made unnecessary, the construction of the apparatus can be simplified. The setting operation of the operator also becomes unnecessary, so that the convenience is improved.

The image forming methods as described in the first and second embodiments also belong to the scope of the invention.

Figure 14:
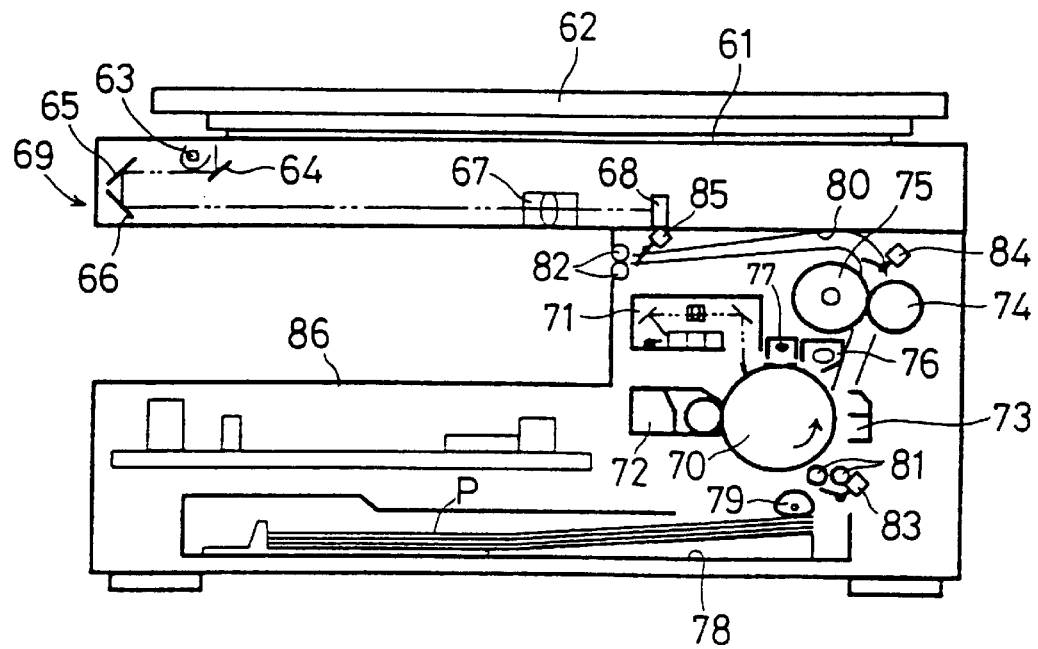
FIG. 14 is a diagram showing the body of a copying machine to which the first and second embodiments of the invention can be applied.
Figure 15:
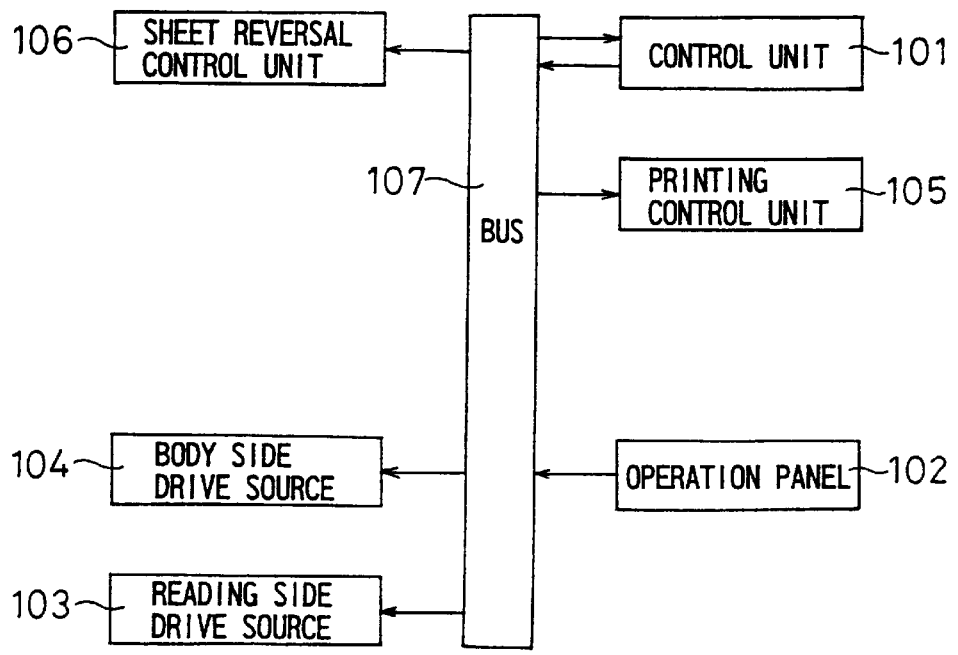
FIG. 15 is a block diagram of a copying machine of a related art which operates in the S-D mode.
Figure 16:
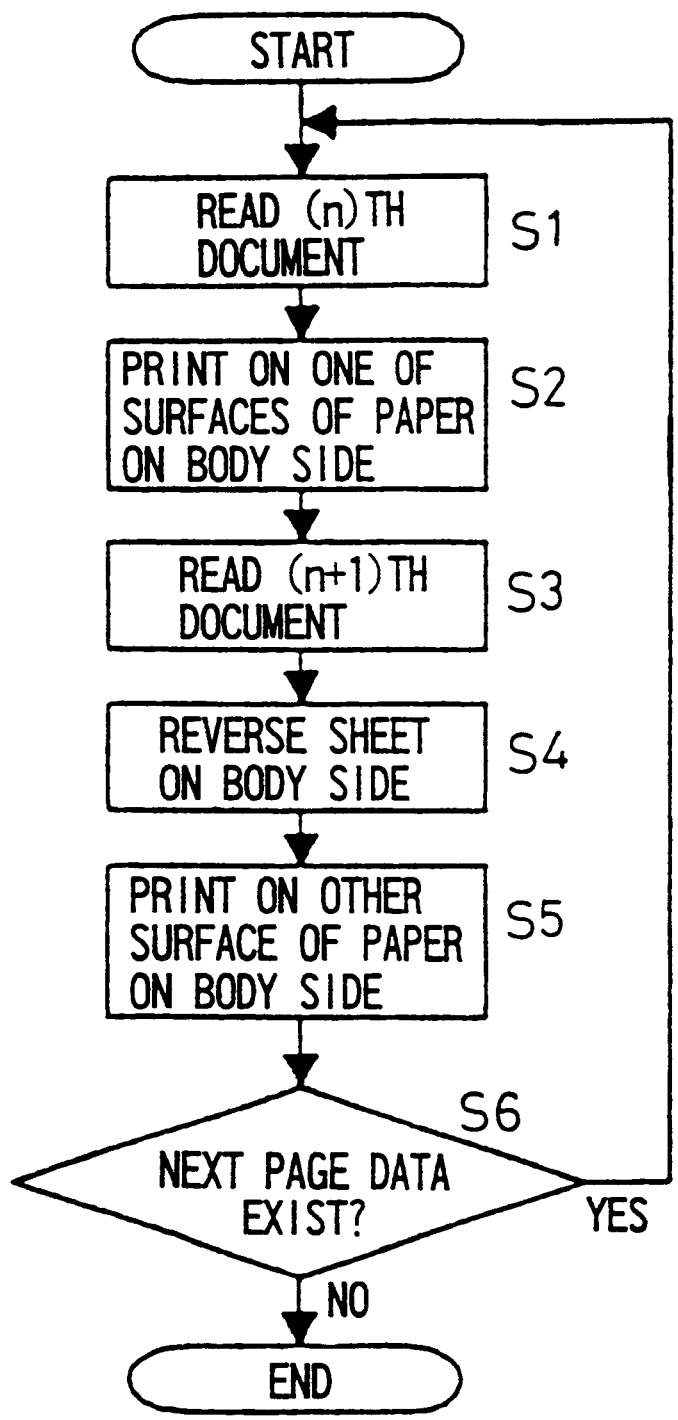
FIG. 16 is a flowchart showing an image forming operation of the copying machine of FIG. 15.
Figure 17:
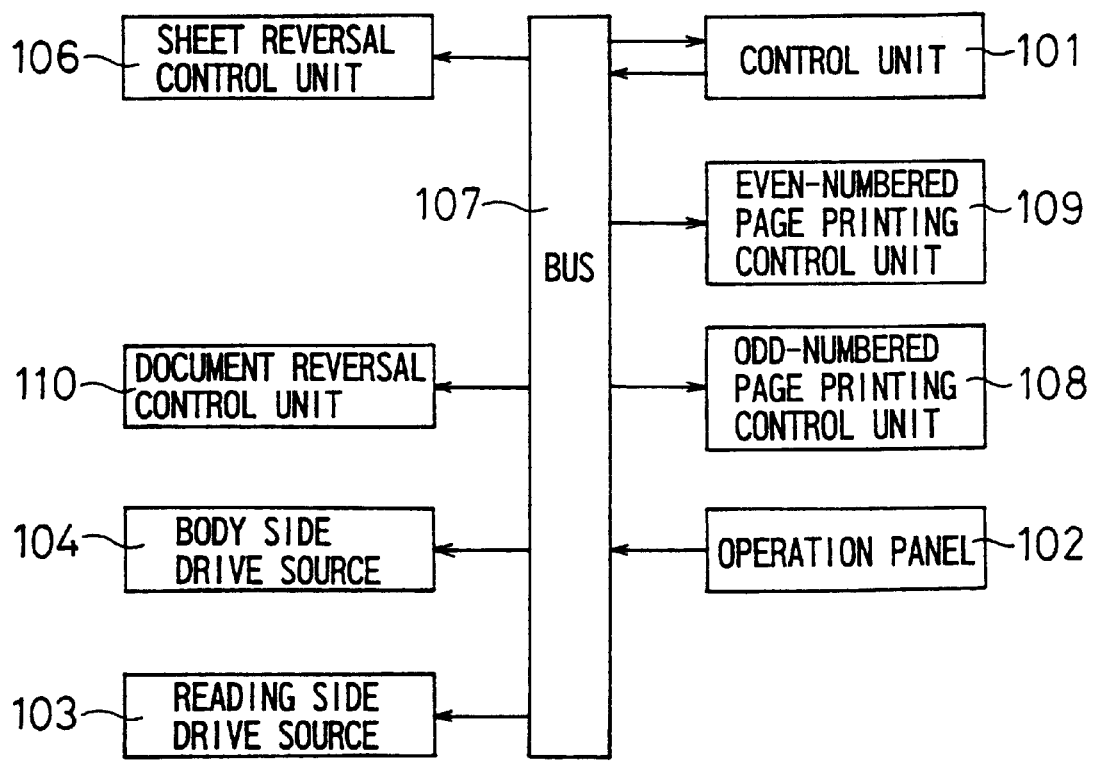
FIG. 17 is a block diagram of a copying machine of another related art, which operates in the D-D mode.
Figure 18:
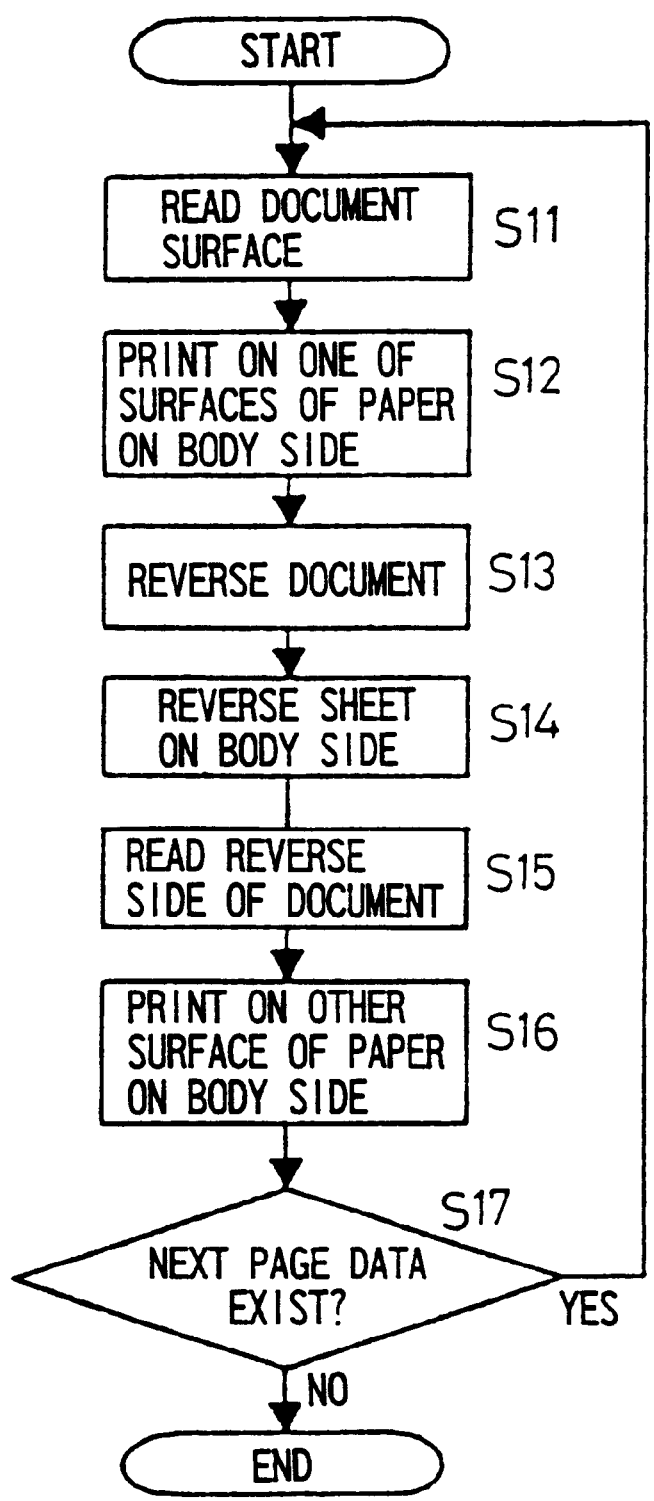
FIG. 18 is a flowchart showing an image forming operation of the copying machine of FIG. 17.

FIG. 14 is a diagram showing the body part of a copying machine to which the first and second embodiments can be applied. By mounting a circulating type automatic document feeder as a document transport part on the body, the copying machine 1a or 1b can be realized. To be specific, the body of the copying machine of FIG. 14 comprises a document supporting plate 61 on which the document D is placed and the document transport part such as the circulating type automatic document feeder is mounted on the document supporting plate 61. The document supporting plate 61 is a transparent member made of glass or the like and its top face is covered with a cover 62.

In relation to the image reading part, the body of the copying machine has a scanner optical system 69. The scanner optical system 69 is disposed below the document supporting plate 61 and comprises a light source 63 for emitting light onto the document D placed on the document supporting plate 61, an image forming lens 67, a photoelectric converter (CCD) 68, and reflecting mirrors 64 to 66 for guiding reflection light from the document D to the photoelectric converter 68 via the image forming lens 67. The image read from the document D is subjected to predetermined image processing.

Relating to the image forming part, the body of the copying machine comprises a photosensitive drum 70, a laser scanning unit (LSU) 71 for forming an electrostatic latent image on the surface of the photosensitive drum 70, a developing unit 72 for developing the electrostatic latent image with developing powders, a transfer charger 73 for transferring the developing powders on the surface of the photosensitive drum 70 onto the sheet of recording paper P, fixing rollers 74 and 75 for fixing the transferred developing powders onto the sheet of recording paper P, a cleaning unit 76 for removing unnecessary developing powders on the surface of the photosensitive drum 70, and a charging unit 77 for charging the photosensitive drum 70 to a predetermined potential.

Relating to the recording paper transport part, the body of the copying machine comprises a recording paper cassette 78 for housing the sheet of recording paper P, a path 80 through which the sheet of recording paper P is transported, a paper feeding roller 79 for feeding the sheets of recording paper P from the recording paper cassette 78 one by one into the path 80, resist rollers 81 for sending the fed sheet of recording paper P to the image forming part at a predetermined timing synchronized with the developing powder image formed on the surface of the photosensitive drum 70, paper ejecting rollers 82 for ejecting the sheet of recording paper P after image formation to an output tray 86, a sensor 83 for sensing the sheet of recording paper P on the upstream side in the recording paper feeding direction of the resist rollers 81, a sensor 84 for sensing the sheet of recording paper P on the downstream side in the recording paper feeding direction of the fixing rollers 74 and 75, and a sensor 85 for sensing the sheet of recording paper P on the upstream side in the recording paper feeding direction of the paper ejecting rollers 82.

The recording paper cassette 78 is disposed in the lower part of the copying machine and the image forming part is arranged above the recording paper cassette 78. The sheet of recording paper P on which the image is formed is ejected from a place which is near the image forming part, above the recording paper cassette 78, and below the scanner optical system 69.

In the first and second embodiments, all of the image information read from the document D is not stored into the RAM 26. According to the first embodiment, only the image information read from the document D of an odd-numbered page is stored into the RAM 26. According to the second embodiment, only the image information read from the surface of the document D is stored into the RAM 26. In each of the copying machines 1a and 1b as shown in FIGS. 1 and 9, the transfer unit 22 is disposed above on the right side of the paper feeding cassette 5 and the output tray 12 is disposed above the paper feeding cassette 5 in FIGS. 1 and 9, thereby miniaturizing the apparatus. In the copying machine in which the components are arranged in such a manner, when the copying operation is performed without storing the image information into the RAM 26, the sheets of recording paper P cannot be ejected in order of page. However, by storing the image information into the RAM 26 as in the first and second embodiments, the apparatus can be miniaturized and the sheets of recording paper P can be ejected in accordance with the order of pages. The positions of the photosensitive drum 19 and the transfer unit 22 sandwiching the path 6 can be changed with respect to the right and left sides in FIGS. 1 and 9. From the viewpoint of the miniaturization of the apparatus, however, it is preferable that the photosensitive drum 19 is disposed on the left side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

reading means for reading an image on a document;

document transporting means for sequentially transporting documents to the reading means;

image forming means for forming an image on a sheet of recording paper;

recording paper transporting means for transporting the sheet of recording paper; and storing means for storing image information read by the reading means, the apparatus further comprising control means, for allowing an image drawn on one side of each document to be sequentially read by the reading means and formed on both sides of each sheet of recording paper by the image forming means, for allowing an image of an odd-numbered document to be initially read by the reading means and stored into the storing means, for allowing an image of an even-numbered document to be next read by the reading means and then directly formed on one of the surfaces of a sheet of recording paper by the image forming means prior to the odd-numbered document being read out of the storing means and formed on the other surface of the sheet of recording paper, for allowing the sheet of recording paper to be turned upside down by the recording paper transporting means, for allowing the image of the odd-numbered document stored in the storing means to be then read out and formed on the other surface of the sheet of recording paper by the image forming means, and for allowing the sheet of recording paper to be transported with the other surface facing downward by the recording paper transporting means.

2. The image forming apparatus of claim 1, further comprising:

detecting means for detecting the size of the document;

determining means for comparing the size of the detected document with a size of a predetermined reference document and determining whether the detected document is larger or not; and thinning means for thinning out image information read from the document when the detected document is larger on the basis of the determination result and storing the resultant image into the storing means.

3. The image forming apparatus of claim 1, wherein the storage capacity of the storing means is determined on the basis of an amount of image information read from the first document.

4. An image forming apparatus comprising:

reading means for reading an image on a document;

document transporting means for sequentially transporting documents to the reading means;

image forming means for forming an image on a sheet of recording paper;

recording paper transporting means for transporting the sheet of recording paper; and storing means for storing image information read by the reading means, the apparatus comprising control means, for allowing images drawn on both sides of each document to be sequentially read by the reading means and formed on both sides of each sheet of recording paper by the image forming means, for allowing an image on the front side of a document to be read by the reading means and stored into the storing means, for allowing an image on the back side of the document to be next read by the reading means and then directly formed on one of the surfaces of a sheet of recording paper by the image forming means prior to the front side of the document being read out of the storing means and printed on the other surface of the sheet of recording paper, for allowing the sheet of recording paper to be turned upside down by the recording paper transporting means, for allowing the image of the front side of the document stored in the storing means to be then read out and printed on the other surface of the sheet of recording paper by the image forming means, and for allowing the sheet of recording paper to be transported with the other surface facing downward by the recording paper transporting means.

5. The image forming apparatus of claim 4, further comprising:

detecting means for detecting the size of the document;

determining means for comparing the size of the detected document with the size of a predetermined reference document and determining whether the detected document is larger or not; and thinning means for thinning out the read image information when the detected document is larger on the basis of the determination result and storing the resultant information into the storing means.

6. The image forming apparatus of claim 4, wherein the storage capacity of the storing means is determined on the basis of the amount of the image information read from the surface of the first document.

7. An image forming method of sequentially reading images drawn on one side of documents and forming the images thereof on both sides of a sheet of recording paper, comprising:

a step of reading and storing an image of an odd-numbered document;

a step of next reading an image of an even-numbered document and directly forming the image thereof on one of the surfaces of a sheet of recording paper prior to reading out the stored image of the odd-numbered document and forming an image thereof on the other surface of the sheet of recording paper;

a step of turning the sheet of recording paper upside down;

a step of then reading out the stored image of the odd-numbered document and forming the image thereof on the other surface of the sheet of recording paper; and a step of transporting the sheet of recording paper with the other surface facing downward.

8. An image forming method of sequentially reading images drawn on both sides of a document and forming the images thereof on both sides of a sheet of recording paper, comprising:

a step of reading and storing an image of the front side of a document;

a step of next reading an image of the back side of the document and directly printing the image of the back side of the document on one of the surfaces of the sheet of recording paper prior to reading out the stored image of the front side of the document and forming an image thereof on the other surface of the sheet of recording paper;

a step of turning the sheet of recording paper upside down;

a step of then reading out the stored image of the front side of the document and forming the image thereof on the other surface of the sheet of recording paper; and a step of transporting the sheet of recording paper with the other surface facing downward.

9. An image forming apparatus comprising:

reading means for reading an image on a document;

document transporting means for sequentially transporting documents to the reading means;

image forming means for forming an image on a sheet of recording paper;

recording paper transporting, means for transporting the sheet of recording paper; and storing means for storing image information read by the reading means, the apparatus further comprising control means, for allowing an image drawn on one side of each document to be sequentially read by the reading means and formed on both sides of each sheet of recording paper by the image forming means, for allowing an image of an odd-numbered document to be read by the reading means and stored into the storing means, for allowing an image of an even-numbered document to be next read by the reading means and then formed directly on one of the surfaces of a sheet of recording paper by the image forming means prior to the odd-numbered document being read out of the storing means and formed on the other surface of the sheet of recording paper, for allowing the sheet of recording paper to be turned upside down by the recording paper transporting means, for then allowing the image of the odd-numbered document stored in the storing means to be read out and formed on the other surface of the sheet of recording paper by the image forming means, and for allowing the sheet of recording paper to be transported with the other surface facing downward by the recording paper transporting means, the apparatus further comprising, detecting means for detecting the size of the document;

determining means for comparing the size of the detected document with a size of a predetermined reference document and determining whether the detected document is larger or not; and thinning means for thinning out image information read from the document when the detected document is larger on the basis of the determination result and storing the resulted image into the storing means.

10. An image forming apparatus comprising:

reading means for reading an image on a document;

document transporting means for sequentially transporting documents to the reading means;

image forming means for forming an image on a sheet of recording paper;

recording paper transporting means for transporting the sheet of recording paper; and storing means for storing image information read by the reading means, the apparatus comprising control means, for allowing images drawn on both sides of each document to be sequentially read by the reading means and formed on both sides of each sheet of recording paper by the image forming means, for allowing an image on the front side of a document to be read by the reading means and stored into the storing means, for allowing an image on the back side of the document to be read by the reading means and then formed directly on one of the surfaces of a sheet of recording paper by the image forming means prior to the front side of the document being read out of the storing means and formed on the other surface of the recording paper, for allowing the sheet of recording paper to be turned upside down by the recording paper transporting means, for allowing the image of the first side of the document stored in the storing means to be then read out and formed on the other surface of the sheet of recording paper by the image forming means, and for allowing the sheet of recording paper to be transported with the other surface facing downward by the recording paper transporting means, the apparatus further comprising, detecting means for detecting the size of the document;

determining means for comparing the size of the detected document with the size of a predetermined reference document and determining whether the detected document is larger or not; and thinning means for thinning out the read image information when the detected document is larger on the basis of the determination result and storing the resultant information into the storing means.

11. An image forming method of sequentially reading images drawn on one side of documents and forming the images thereof on both sides of a sheet of recording paper, comprising:

a step of reading and storing an image of an odd-numbered document;

a step of next reading an image of an even-numbered document and directly forming the image thereof on one of the surfaces of a sheet of recording paper prior to reading out the stored image of the odd-numbered document and forming an image thereof on the other surface of the sheet of recording paper;

a step of turning the sheet of recording paper upside down;

a step of then reading out the stored image of the odd-numbered document and forming the image thereof on the other surface of the sheet of recording paper; and a step of transporting the sheet of recording paper with the other surface facing downward, a step of detecting the size of the document;

a step of comparing the size of the detected document with a size of a predetermined reference document and determining whether the detected document is larger or not; and a step of thinning out image information read from the document when the detected document is larger on the basis of the determination result and storing the resultant image into the storing means.

12. An image forming method of sequentially reading images drawn on both sides of a document and forming the images thereof on both sides of a sheet of recording paper, comprising:

a step of reading and storing an image on the front side of a document;

a step of next reading an image on the back side of the document and directly printing the image on one of the surfaces of the sheet of recording paper prior to reading out the stored image of the front side of the document and forming an image thereof on the other surface of the sheet of recording paper;

a step of turning the sheet of recording paper upside down;

a step of then reading out the stored image of the front side of the document and forming the image thereof on the other surface of the sheet of recording paper; and a step of transporting the sheet of recording paper with the other surface facing downward, a step of detecting the size of the document;

a step of comparing the size of the detected document with the size of a predetermined reference document and determining whether the detected document is larger or not; and a step of thinning out the read image information when the detected document is larger on the basis of the determination result and storing the resultant information into the storing means.

* * * * *